UNITED STATES PATENT OFFICE.

ALANSON BARNARD, OF CINCINNATI, OHIO, ASSIGNOR TO HIMSELF, WILLIAM H. SETTLE, AND JOSEPH MESSENGER, OF SAME PLACE.

IMPROVEMENT IN WATER-PROOF COMPOUNDS.

Specification forming part of Letters Patent No. 171,209, dated December 21, 1875; application filed June 2, 1875.

*To all whom it may concern:*

Be it known that I, ALANSON BARNARD, of Cincinnati, county of Hamilton and State of Ohio, have invented a new and Improved Water-Proof Compound; and I do hereby declare the following to be a full, clear, and true description thereof.

This invention relates to a compound made of asbestus, paraffine or bees-wax, and either coal-tar or pine-tar, which ingredients are prepared and mixed together in about the following proportions, viz: One part, by weight, of either paraffine or bees-wax; four parts of asbestus reduced to a fibrous state; eight parts of coal-tar or pine-tar.

First, the paraffine or bees-wax should be melted by a moderate heat, and then mixed with the tar. Second, the asbestus, after having been first reduced to a fibrous state, should be well mixed with the mixture of paraffine and tar, and should be thoroughly incorporated with it, when the mixture is ready for use.

The foregoing will give a good mixture; but the relative proportions of the ingredients used must be changed, so as to produce a mixture to meet the requirements and the nature of the work to be done. For instance, my compound can be reduced to a consistency so as to be readily applied with a brush. Secondly, it may be made of such a consistency that it can be rolled or pressed into sheets of any thickness required, or to be applied with a trowel. Thirdly, it can be made so that it will continue for any length of time in a pliable condition; or it may be made so as to assume very great hardness in a short time; these changes being the results of changing the relative proportions of the ingredients used. The tar, in certain cases, can be dispensed with.

My compound is impervious to water, and can be applied, with advantage, to any kind of fabric, from the finest to the coarsest, and to leather, without in the least impairing their pliability or softness. It can be applied, with much advantage, to boots and shoes, as its application in the proper manner will render them impervious to water or moisture without causing any perceptible increase in the size of the boots or shoes in which it may have been used. It can likewise be used to advantage on the leather or other fabrics for insoles or linings to be worn next the foot.

My compound is not only a water-proof material, but it is likewise a good non-conductor, and will prevent, in a great measure, the electricity passing from the system, if properly used.

What I claim as new, and desire to secure by Letters Patent, is—

A compound made of asbestus, paraffine, bees-wax or other wax, and coal-tar or pine-tar, substantially in the manner and in about the proportions herein specified, and for the purposes set forth.

ALANSON BARNARD.

Witnesses:
JOSEPH T. BOONE,
WM. A. BOONE.